No. 771,011. PATENTED SEPT. 27, 1904.
J. W. HAYWARD.
BRICK PROVIDED WITH VITREOUS OR GLASS FACE.
APPLICATION FILED JAN. 9, 1904.
NO MODEL.
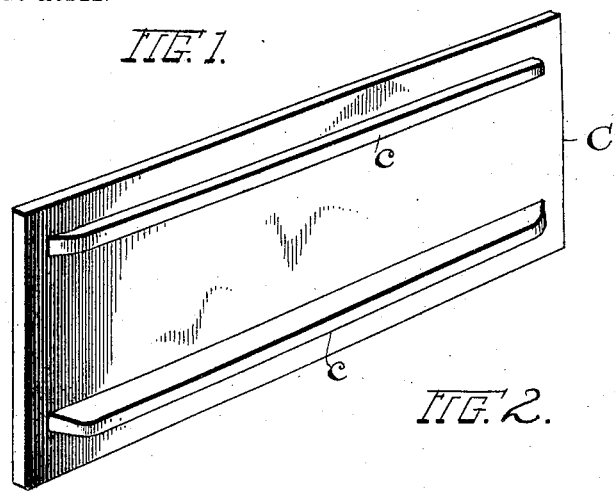
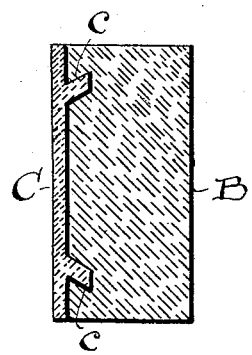
WITNESSES:
INVENTOR.
John W. Hayward
BY
ATTORNEY.

No. 771,011. Patented September 27, 1904.

UNITED STATES PATENT OFFICE.

JOHN W. HAYWARD, OF CLEVELAND, OHIO.

BRICK PROVIDED WITH VITREOUS OR GLASS FACE.

SPECIFICATION forming part of Letters Patent No. 771,011, dated September 27, 1904.

Application filed January 9, 1904. Serial No. 188,338. (No model.)

*To all whom it may concern:*

Be it known that I, JOHN W. HAYWARD, a citizen of the United States, residing at Cleveland, in the county of Cuyahoga and State of Ohio, have invented certain new and useful Improvements in Bricks Provided with Vitreous or Glass Faces; and I do declare that the following is a full, clear, and exact description of the invention, which will enable others skilled in the art to which it appertains to make and use the same.

My invention relates to improvements in glass face-plates; and the invention consists in a facing or face-plate for bricks having inclined or undercut ribs upon its back and in a brick embodying said facing or plate as an integral part thereof, all substantially as shown and described, and particularly pointed out in the claims.

In the accompanying drawings, Figure 1 is a rear perspective view of the glass facing or plate, and Fig. 2 is a cross-section of a complete brick with which the said facing is incorporated.

As thus shown, the face-plate itself is a distinct and separate article of manufacture and sale apart from the body of the brick and is intended to go to the manufacturer of brick in any size or color he may desire. In point of size the said facing may be made large or small, varying both in length and width, as may be preferred, and more or less dependent on the place of use and whether for interior or exterior purposes.

I am aware that it is not at this time broadly new to make a brick with a glazed or glass facing of some kind, and I am also aware that glass facings as a separate manufacture have been applied to previously-made cement and other brick bodies by one form and another of temporary or permanent fastening or connection; but I have found through considerable experience with brick of this general character that it is easy for them to have defects of one kind and another which are more or less fatal to their adoption and use, and among such defects I may mention any and all constructions of a facing which is unsupported on its back by a rib or its equivalent to permit it to be handled in the manufacture and while comparatively soft without warping or bending it more or less by such handling. Also any style of brick which is so constructed as to leave it more or less open between its body and face-plate, so that moisture can creep in and cause damage by freezing and the like, and all constructions in which the facing is not perfectly and permanently secured to the body or is so slenderly or poorly supported that it will become loose by shipping or handling. This is apt to occur in all bricks having special mechanical fastenings for the facings. Still other defects might be mentioned; but possibly the foregoing are the most serious and common. Now I have devised a construction of brick in which at least all the above-enumerated objections are absolutely avoided or remedied, and there are no other material defects to which it is liable so far as I am aware or which a practical glassman cannot anticipate or overcome as it arises. To these ends I make the body B of my brick preferably of a suitable cement mixture, so as to produce a very firm and durable brick when finished; but a body of clay or other suitable material of requisite firmness may be used, and this body is provided with a facing C, of glass, which may be varied in kind and color according to the use to which it is to be applied and whether for interior or exterior work. The color of the glass is determined by choice and runs from pure white to any of the more attractive colors, such as red, blue, green, yellow, pink, or the like, or mottled, if desired. The said face or facing is novel in this essential particular that it is constructed with medium-weight ribs $c$ upon the rear thereof along its edges, and said ribs are of uniform thickness and inclined and serve to effectually lock the face upon the body of the brick and incorporate it with the body as intimately and firmly as if it were homogeneous therewith or part of the same material as the body B. By placing the rib approximately near the edge of the facing and burying the same in the body of the brick all around when said body is formed it is impossible for moisture to work in behind the facing, and since the method of manufacture is by heavy pressure in a mold while the material out of which the body is formed is in a flowing state I am enabled to press the face so firmly upon the body and make its holdings thereon so secure that body and face become essentially one, and a unitary brick is produced with a common body and a finished glass face. In any case the lengthwise rib is essential, because the face-plate has to be handled between molding and annealing, and it is in this period that the greatest difficulty is met, because the glass is in a soft or flexible state and exceedingly liable to be bent, and any bending at this time stays and cannot be gotten out. Furthermore, each plate is handled individually in making the transfer, and it is practically impossible to handle all plain flat plates without a fatal percentange of injuries. Hence I have conceived the idea of providing strengthening ribs or webs along each side edge which are deep and strong enough to prevent bending in the flexible state of the facing and are so constructed as to permanently incorporate the facing with the body of the brick in the final manufacture. Thus said ribs are made to serve a dual manufacturing purpose, while they also protect the facing from breakage in shipping and handling.

The term "brick" as used herein is intended to include what are known as "building-blocks," "artificial stone," "tile," and like manufactures, solid or hollow, upon which a face-plate or glass facing may be used.

What I claim is—

1. As a new article of manufacture, a glass facing-plate of uniform thickness for bricks provided with a rib lengthwise on its back near each edge and said ribs inclining laterally and terminating back from the end of the facing, thus leaving an unribbed portion at each end of the brick, substantially as described.

2. A glass facing for bricks consisting of a plate of equal thickness throughout and provided on its rear with a pair of ribs having substantially the same thickness in cross-section as said plate and laterally inclined in respect to each other, said ribs terminating within the ends of the plate, substantially as described.

In testimony whereof I sign this specification in the presence of two witnesses.

JOHN W. HAYWARD.

Witnesses:
R. B. MOSER,
C. A. SELL.